Aug. 7, 1945.   J. J. NAUGLE   2,381,462
FILTERING MEANS
Filed June 13, 1942   2 Sheets-Sheet 2

INVENTOR.
John J. Naugle
BY
Lemlein + Woolsey
ATTORNEYS

Patented Aug. 7, 1945

2,381,462

UNITED STATES PATENT OFFICE 2,381,462

FILTERING MEANS

John J. Naugle, New York, N. Y.

Application June 13, 1942, Serial No. 446,944

9 Claims. (Cl. 210—153)

My present invention relates to filtering means and aims to devise a means of the general character indicated which is simple in construction, easy and economical to fabricate and assemble and which is capable of a wide variety of applications. My present invention also includes a method of using the aforementioned means.

In the accompanying specification I shall describe and in the annexed drawings show an illustrative embodiment of the filtering means of the present invention. It is, however, to be clearly understood that I do not wish to be limited to the exact details herein shown and described for purposes of illustration only inasmuch as changes may be made without the exercise of invention and within the scope of the claims hereto appended.

In the accompanying specification I shall also describe an illustrative embodiment of the method of using the means of the present invention and here too it is to be clearly understood that I do not wish to be limited to the exact details set forth. Nor is the means of the present invention to be limited in its use to the method of the present invention and vice versa.

In the accompanying drawings.

Figure 1:
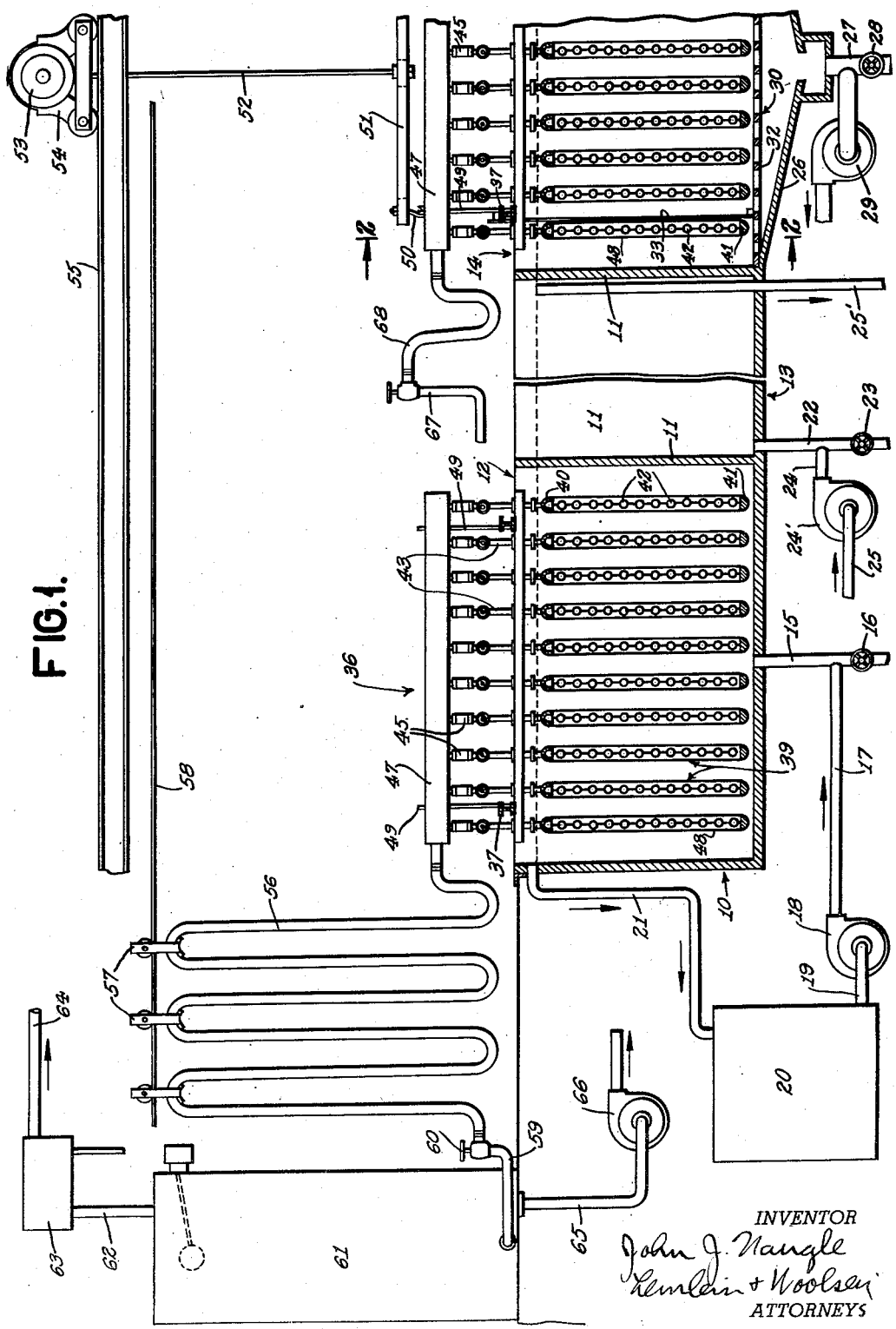
Figure 1 is a partially schematic, partially longitudinal sectional view of a system of filtration made in accordance with the aforesaid illustrative embodiment of the present invention.
Figure 2:
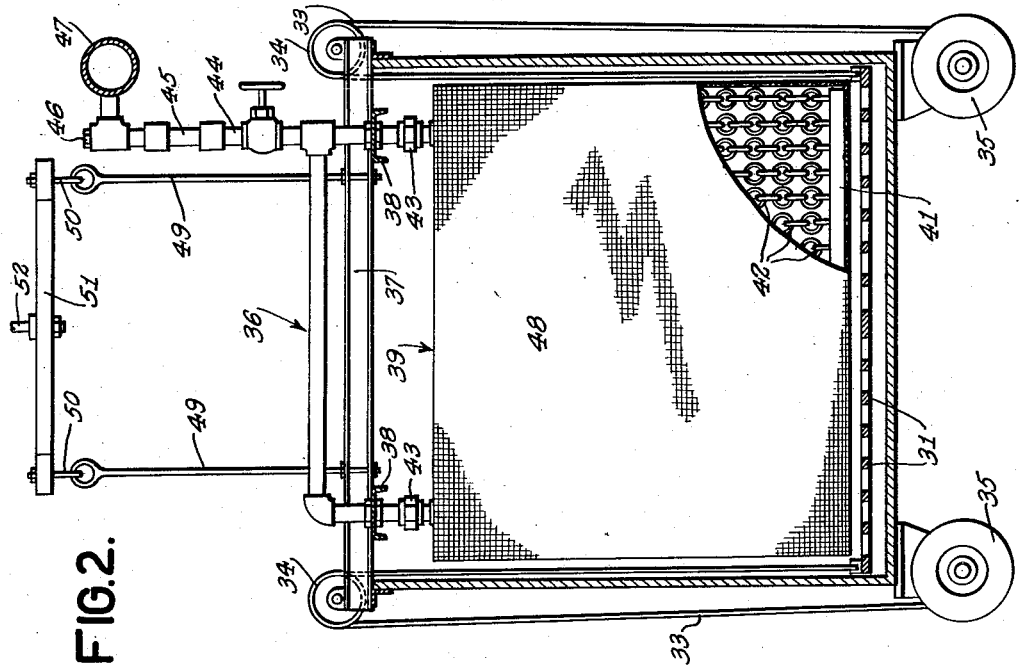
Figure 2 is a transverse sectional view taken along line 2—2 of Figure 1, the same being partially broken away to more clearly show the inner construction.
Figure 3:
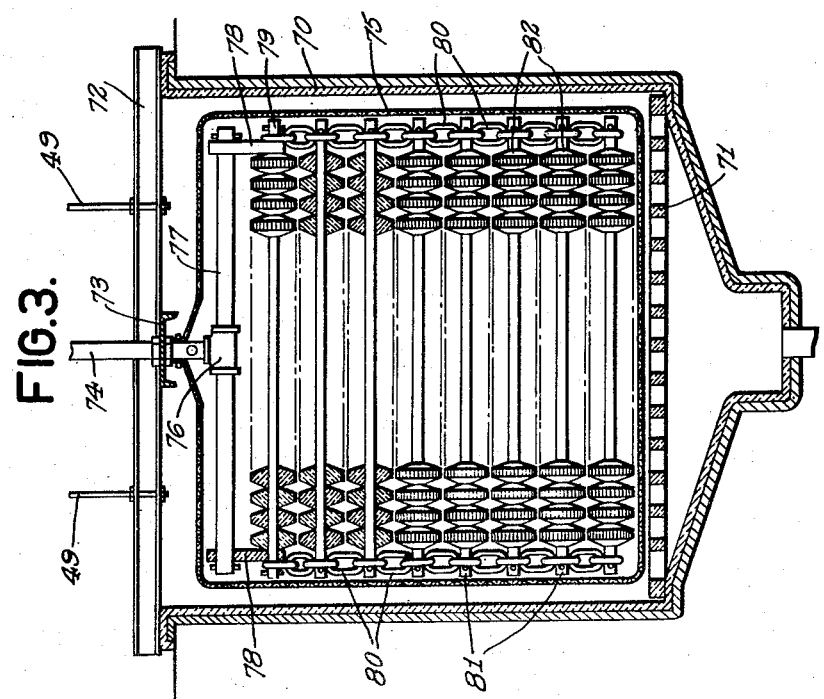
Figure 3 is a view similar to Figure 2 but showing a modified form of filter leaf intended to be used as part of the system as a whole.
Figure 4:
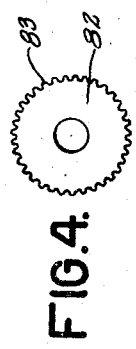
Figure 4 is an enlarged detailed planned view of a scrubbing washer comprising a part of the filter leaf shown in Figure 3.

Referring now in detail to the aforesaid illustrative embodiment of the present invention and with particular reference to Figures 1 and 2 of the drawings illustrating the same, numeral 10 generally designates an oblong tank provided with a plurality of partitions 11 dividing the tank into three compartments 12, 13, and 14, the first of these compartments being known as a filtering section, the second as a washing section and the last as a sludge section.

The filtering section 12 includes an inlet-drain pipe 15 controlled by a valve 16. Communicating with the pipe 15 is a pump outlet pipe 17 in turn communicating with a pump 18 the other side of which is connected with a pump inlet 19 leading from a supply tank 20 adapted to store whatever liquid it is desired to filter. Near the upper level of the tank 12, there is provided an over-flow pipe 21 connecting back to the supply tank 20.

The washing section 13 is provided with an inlet-drain pipe 22 controlled by a valve 23 and communicating with the pipe 22 there is provided another pipe 24 connected with a pump 24'. The opposite side of the pump is connected with a pipe 25 leading to a source of hot water as will hereinafter be more fully explained.

The washing section is completed by an overflow pipe 25' the inlet end of which is adjacent the upper level of the tank.

In the sludge section 14, the conventional flat bottom wall is replaced by a conical wall 26 the apex of which communicates with an outlet pipe 27 controlled by a valve 28. Connected with the outlet pipe 27 is a pump 29 for removing the broken cake which will be accumulated in this section of the tank as will hereinafter be more fully described. Resting at the bottom of the section 14, adjacent the base of the conical wall 26 is a grid 30 comprised of a plurality of longitudinal bars 31 and a plurality of transverse bars 32, the grid having connected therewith a plurality of cables 33 extending up through the tank and being trained over pulleys 34 and then extending downwardly outside of the tank and being secured to drums 35, the arrangement being such that rotation of the drums 35 results in raising and lowering of the grid 30 for a purpose to be hereinafter fully set forth.

There is adapted to be used in connection with the tank described, a filtering means 36, the filtering means including a pair of I beams 37 which are intended to rest upon the upper edges of the tank and support the filter leaves later to be described. Secured to the transverse I beams is a pair of longitudinal channel members 38 from which depends a plurality of filter leaves 39.

Each filter leaf includes a rigid channel member 40 at the top thereof and a rigid bar 41 at the bottom thereof, the members 40 and 41 being connected by a multiplicity of chain links 42 so that the whole structure becomes completely flexible or articulated. Rising from the channel member 40 is a pair of coupled outlet pipes 43 communicating with a fitting 44 provided with a sight glass 45 which enables watching the operation of each individual leaf, and a clean-out plug 46, each fitting 44 communicating with a main manifold 47. The top and bottom rigid members 40 and 41 and the flexible structure 42 intermediate the same are enclosed in a conventional cloth filter bag 43.

Rising from each of the I beams 37 is a pair of rods 49 provided with eyes engageable with hooks 50 carried on a frame 51 suspended from a cable 52, the latter being wound about a drum (not shown) mounted on a shaft of a motor 53 which is carried by a trolley 54 adapted to ride on overhead rails 55. The arrangement is such that the filter assembly can be raised out of one tank section and moved over and lowered into another tank section for a purpose which will be more clearly understood from the description of the method preferably used with the means of the present invention.

The main manifold 47 may be coupled with a flexible hose 56 suspended from pulleys 57 adapted to ride along on an overhead cable 58, the other end of the hose 56 communicating with a filtrate-receiver inlet 59 controlled by a valve 60 with which a filtrate tank 61 is provided adjacent the lower end thereof. The upper end of the filtrate tank or receiver communicates with a pipe 62 in turn connected with a conventional condenser 63 which, through a pipe 64, is connected with a pump (not shown) for drawing a vacuum. The filtrate receiver 61 is completed by an outlet pipe 65 in the bottom wall thereof which communicates with an exhaust pump 66.

Adjacent the sludge tank 13 there is provided a hot water stand pipe 67 which may be coupled, as hereinafter set forth, by means of a flexible hose 68, with the main manifold 47.

This completes the description of the first embodiment of the filtering means of the present invention and the method which it is preferred to be used therewith may be described as follows:

With the filter assembly lowered into the filtering section 12 of the tank 10, the liquid to be filtered, which is in the supply tank 20 is pumped into the bottom of the section 12. The liquid is continually pumped as described so that the excess thereof overflows and is returned to the supply tank. By so doing, I am assured the even distribution or deposition of the matter to be filtered out of the liquid or the cake. With the flexible hose 56 coupled to the main manifold 47, I draw a vacuum through the filtrate receiver 61, hose 56, manifold 47 and interior of the filter leaves 39. As soon as the rate of filtration drops to a pre-determined point, I lift the entire filter assembly out of the filter section 12 by means of the overhead trolley and move the same into the washing section 13.

Hot water is then forced into this section through the pump 24' and with the hose 56 still coupled with the main manifold 47 I continue to draw vacuum so that any soluble values which may be contained in the cake adhering to the filter leaves may be dissolved out and subsequently recovered. Upon completion of the washing operation, the hose 56 is removed from the manifold 47, the filter assembly is lifted out of the washing section 13 and is lowered into the sludge section 14. At this time the manifold 47 is coupled by means of the flexible hose 68 to the hot water stand pipe 67. The hot water is now forced through the filter leaves in the reverse direction to the previous flow of the filtrate and simultaneously the grid 30 is raised so as to collapse the flexible filter leaves 39. Because of the relatively close spacing of the filter leaves this collapsing action causes the leaves to be rubbed together in the manner of scrubbing so that the filter cake previously deposited thereon is easily removed and drops through the grid into the bottom of the sludge section from where, together with the cleaning water forced through the filter leaves it is removed by means of the pump 29.

If desired, and while the filter assembly is being cleaned in the sludge section 14, another or duplicate filter assembly may be in operation in the filtering section 12 so that the system can be operated continuously or with very little interruption.

This completes the description of the method which I prefer to have used with the filtering means of the present invention.

The device hereinbefore described is made almost entirely of metal and is admirably adapted for use in the filtering of sugar solutions or any other liquids which do not attack metal. However, many solutions such as acids, alkalies, etc., cannot be filtered in devices of this type inasmuch as they have a tendency to attack the materials of which the devices are made. In order to overcome this disadvantage I propose the following modification of the foregoing filtering system:

I provide the tank 10 with a glass lining 70 and I substitute in the sludge section 14 a glass grid 71 in place of the metal grid 30 previously described.

I again use a pair of transverse I beams 72 which support a central longitudinal channel 73 from which depend a plurality of glass outlet pipes 74 connected with a glass manifold (not shown), at their upper ends. The glass outlet pipes 74 pass through conventional cloth filter bags 75 and are secured in T fittings 76, each of the latter supporting heavy glass rod 77 at the outer ends of which I provide solid glass links 78 the lower ends of which engage a light glass rod 79. Suspended from the latter, at each end thereof is a chain 80 made of glass links and spaced a few links apart I provide a plurality of glass rods 81. The rods 81 are each provided with a multiplicity of glass washers or discs provided with serrated peripheral faces 83. The filter leaves just described are adapted to be used in exactly the same manner as set forth in the earlier portion of this specification and are adapted to be cleaned through the same kind of a scrubbing action, it being obvious that these leaves too are of an articulated or flexible construction which lends itself admirably to the type of scrubbing action necessary to obtain proper removal of the cake from the filter bag.

This completes the entire description of the aforesaid illustrative embodiment of the present invention and the modification thereof and the method which I prefer to be used in connection therewith and it is to be noted from all of the foregoing that I have provided a filtering means and method which is simple in construction, which is easy and economical to fabricate and assemble and practice and which is admirably adapted to perform the intended functions.

Other objects and advantages of the device and method of the present invention will readily occur to those skilled in the art to which the present invention relates.

What I claim as my invention is:

1. In a filtering tank, an assembly of filter leaves each of which includes an articulated internal structure, means to suspend said filter leaves in the tank, a grid normally resting at the bottom of the tank, and means for moving said grid into engagement with said filter leaves to collapse the latter and cause scrubbing contact between the individual members thereof.

2. In a filtering tank, a plurality of partitions to divide the same into a plurality of compartments, an assembly of filter leaves each of which includes an articulated internal structure, means to suspend said filter leaves successively in said compartments, a grid normally resting at the bottom of one of said compartments, and means for moving said grid into engagement with said filter leaves to collapse the latter and cause scrubbing contact between the individual members thereof.

3. In a filtering tank, a plurality of partitions to divide the same into filtering, washing and sludge compartments, an assembly of filter leaves each of which includes an articulated internal structure, means to selectively suspend said filter leaves in any one of said compartments, a grid associated with said sludge compartment normally resting at the bottom thereof, and means for moving said grid into engagement with said filter leaves to collapse the latter and cause scrubbing contact between the individual members thereof.

4. In a filtering tank, an assembly of non-rigid filter leaves having articulated inner frames, the weight of which maintains the same in normally extended position, means to suspend said filter leaves in the tank, a grid normally resting at the bottom of the tank, and means for moving said grid into engagement with said filter leaves to collapse the latter and cause scrubbing contact between the individual members thereof.

5. In a filtering tank, a plurality of partitions to divide the same into a plurality of compartments, an assembly of non-rigid filter leaves having articulated inner frames, the weight of which maintains the same in normally extended position, means to suspend said filter leaves successively in said compartments, a grid normally resting at the bottom of one of said compartments, and means for moving said grid into engagement with said filter leaves to collapse the latter and cause scrubbing contact between the individual members thereof.

6. In a filtering tank, a plurality of partitions to divide the same into filtering, washing and sludge compartments, an assembly of non-rigid filter leaves having articulated inner frames, the weight of which maintains the same in normally extended position, means to selectively suspend said filter leaves in any one of said compartments, a grid associated with said sludge compartment normally resting at the bottom thereof, and means for moving said grid into engagement with said filter leaves to collapse the latter and cause scrubbing contact between the individual members thereof.

7. A filter leaf comprising a rigid supporting member, a rigid weighting member, a pair of articulated members connecting said supporting and weighting members, a multiplicity of scrubbing elements suspended intermediate said articulated members, and a filter bag enclosing the whole.

8. A filter leaf comprising a rigid supporting member, a rigid weighting member, and a pair of articulated members connecting said supporting and weighting members, a plurality of spaced rigid rods carried by said articulated members intermediate said supporting and weighting members, a multiplicity of scrubbing elements mounted on each of said rods, and a filter bag enclosing the whole.

9. A filter leaf comprising a rigid supporting member, a rigid weighting member, and a pair of articulated members connecting said supporting and weighting members, a plurality of spaced rigid rods carried by said articulated members intermediate said supporting and weighting members, a multiplicity of scrubbing discs having serrated peripheral faces loosely mounted on each of said rods, and a filter bag enclosing the whole.

JOHN J. NAUGLE.